Dec. 17, 1929.                   H. W. LEE                    1,739,512
                            PHOTOGRAPHIC OBJECTIVE
                              Filed Jan. 29, 1925
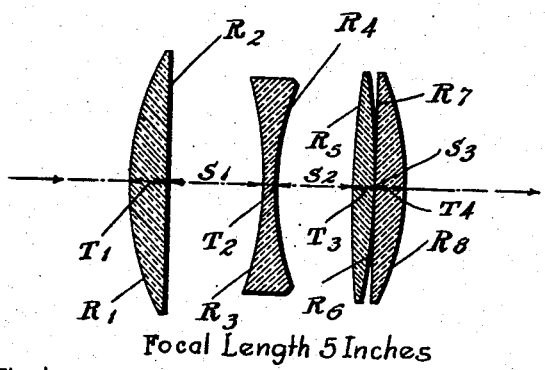
Focal Length 5 Inches
| Radii | Thicknesses and Separations | $n_D$ | V | Number in chance Brothers' Catalogue. |
|---|---|---|---|---|
| R1 +.4256 | T1 .06 | 1.6084 | 56.1 | 5542 |
| R2 -6.582 | S1 .15 | | | |
| R3 -.5481 | T2 .012 | 1.6469 | 33.7 | 337 |
| R4 +.4244 | S2 .12 | | | |
| R5 +1.66 | T3 .03 | 1.6084 | 56.1 | 5542 |
| R6 -1.66 | S3 .001 | | | |
| R7 00 | T4 .04 | 1.6084 | 56.1 | 5542 |
| R8 -.4778 | | | | |

Patented Dec. 17, 1929

1,739,512

UNITED STATES PATENT OFFICE

HORACE WILLIAM LEE, OF LEICESTER, ENGLAND, ASSIGNOR TO KAPELLA LIMITED, OF LEICESTER, ENGLAND, A CORPORATION OF ENGLAND

PHOTOGRAPHIC OBJECTIVE

Application filed January 29, 1925, Serial No. 5,474, and in Great Britain February 6, 1924.

This invention relates to photographic objectives and particularly to the type consisting of a dispersive element placed between two collective systems, and has for its object to provide a lens of this type yielding an extremely large aperture.

With lenses of the type in question heretofore constructed it has not been possible to obtain good definition over a large field at an aperture of more than F/3 or thereabouts. In order to increase the aperture appreciably while retaining a good definition over a large field, it is necessary to reduce the zonal spherical aberration.

I have discovered that the zonal spherical aberration may be reduced by giving the back collective component of the objective the form of two simple collective lenses placed close together but just out of contact with each other. By using a back collective component of this form in combination with a dispersive element and a front collective component, each consisting of a simple lens, I am able to provide an objective giving a good definition over a large field with an aperture as large as F/2.5.

In constructing such a lens I have found it most desirable to make a dispersive element of material of which the refractive index for the D line of the solar spectrum is higher than that of the glass from which any of the collective elements are made.

The accompanying drawing illustrates in axial section a specific lens embodying the invention.

The lens illustrated has a focal length of 5″, and with an aperture of F/2.5 gives a flat field of 40°. The form and position of the components of the lens are defined in the numerical table on the drawing where all data are given as fractions of the focal length.

It should be noted that in the lens shown and described in the drawing the dispersive element is approximately symmetrically positioned in the space between the front collective element and the first collective element of the back. Furthermore, the relative powers of the several elements are so chosen that a parallel beam of light entering, after being converged by the front convergent element, is rendered divergent by the second member, and remains divergent after passing through the two elements of the third member.

It should be understood that the invention is by no means limited to the specific example which has been given.

What I claim is:

1. A photographic objective consisting of a simple dispersive lens located approximately midway between two collective components, in which the back collective component consists of a simple plano-convex lens and a simple double convex lens just out of contact with each other, while the front collective component consists of a simple lens.

2. A photographic objective consisting of a simple dispersive lens located approximately midway between the two collective groups, its axial distance from the nearest point of one group not differing by more than 25% from its axial distance from the nearest point of the other group, and in which the front collective member consists of a simple lens, and the back collective member consists of two simple lenses just out of contact with each other, the separation not exceeding 1% of the equivalent focal length of the complete objective.

3. A lens as claimed in claim 2, in which the relative powers of the component glasses and their mutual separations are such that a parallel beam of light incident on the objective, after first being rendered convergent by the front collective member is rendered divergent by the dispersive member, and further remains divergent after passing through the first of the two collective components comprising the back collective system.

In testimony whereof, I have hereunto set my hand.

HORACE WILLIAM LEE.